United States Patent [19]
Wentorf, Jr.

[11] 3,958,625
[45] May 25, 1976

[54] TRANSPORT OF HEAT AS CHEMICAL ENERGY

[75] Inventor: Robert H. Wentorf, Jr., Schenectady, N.Y.

[73] Assignee: General Electric Company, Schenectady, N.Y.

[22] Filed: July 1, 1974

[21] Appl. No.: 484,802

[52] U.S. Cl. .............................. 165/2; 165/DIG. 17; 165/107; 62/4; 126/263
[51] Int. Cl.² ........................................ F28D 15/00
[58] Field of Search .................. 60/649, 645; 62/4; 126/263; 122/21; 165/2, 107, 66

[56] References Cited
UNITED STATES PATENTS

| | | | |
|---|---|---|---|
| 3,198,710 | 8/1965 | Long...................................... | 62/4 X |
| 3,370,420 | 2/1968 | Johnson................................. | 60/649 |
| 3,714,942 | 2/1973 | Fischel et al......................... | 165/66 X |

OTHER PUBLICATIONS

Dissociation—Cooling, McKisson, RL, Calif. Res. & Dev. Co., Livermore, Calif., Livermore Res. Lab. of AEC(LRL-86), 3/1954.

Primary Examiner—Albert W. Davis, Jr.
Attorney, Agent, or Firm—Leo I. MaLossi; Joseph T. Cohen; Jerome C. Squillaro

[57] ABSTRACT

At a heat source, such as a nuclear reactor, methane and carbon dioxide are reacted (at about 800°–900°C) to form a mixture of carbon monoxide and hydrogen. This mixture of gases is cooled by heat exchange with incoming cold $CH_4$ and $CO_2$ and is then pumped through a first pipeline at ambient temperature to an energy use area. At the energy use end of the first pipeline the gas mixture is heated (to about 350°–500°C) in the presence of steam and a catalyst. The CO and $H_2$ react exothermically to form $CH_4$ and $CO_2$. The heat evolved from this reaction is released across a heat exchanger for use as process heat or for conversion to electricity. Water is condensed and separated from the mixture of gaseous reactants and the dried, cooled $CH_4/CO_2$ mixture is returned to the heat source end via a second pipeline for repetition of the closed loop process described.

5 Claims, 1 Drawing Figure

U.S. Patent   May 25, 1976   3,958,625
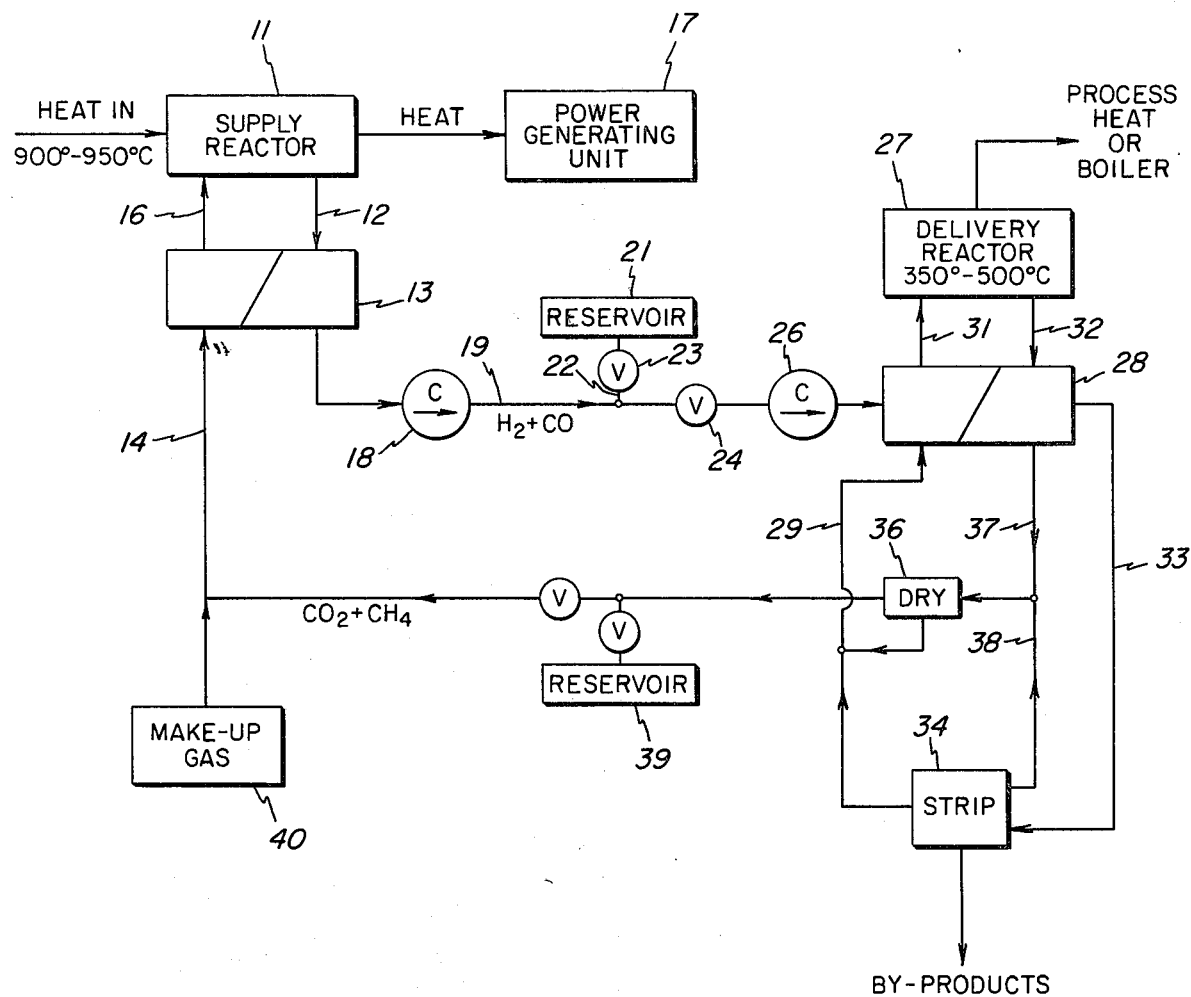

TRANSPORT OF HEAT AS CHEMICAL ENERGY

BACKGROUND OF THE INVENTION

As clean fossil fuels become less available, increasing attention is being given to alternate sources for electrical and thermal energy needs. At present, the most likely candidate for near future development is nuclear energy. The large size requirements and the siting difficulty connected with the nuclear reactor make it necessary to transmit energy over large distances (at least about 100 miles) to energy use areas. Commonly, the energy is transported as electricity via overhead wires. However, urban areas usually need energy for heat as well as for power and it is inefficient to convert heat energy into electrical energy and then back into heat energy even without considering the costs of transportation. Furthermore, despite a growing demand for urban electric power, rights-of-way for overhead power lines are becoming increasingly difficult to obtain. Underground transmission is much more expensive for the same electric power carrying capacity. When the distances from energy generating source to energy use area exceeds several hundred miles, very high voltages are required, thereby compounding the difficulties of transmittig electric power.

In recognition of these difficulties, the Kernforschungsanlage Julich (KFA) has proposed the utilization of a reversible chemical reaction having a large heat of reaction to produce gaseous products of high enthalpy content for the transmission of chemical energy at ambient temperature by underground pipelines from an energy source location to an energy use area. Transmission distances of as much as a thousand miles appear practical.

The KFA effort referred to hereinabove utilizes the chemical reactions:

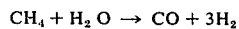

$CH_4 + H_2O \rightarrow CO + 3H_2$  1.

$CO + 3H_2 \rightarrow CH_4 + H_2O$  2.

Reaction 1 is carried on at the heat source (i.e. a high temperature gas reactor), the methane and steam being heated and passed over a catalyst at about 800°–900°C (1100°–1200°K). As the reaction takes place, about 54.1 kcal/gram mol of CO formed is absorbed. The resulting gas mixture is then cooled rapidly by heat exchange with incoming methane and liquid water and is then pumped through a pipeline to the energy use area. At this location, the mixture of gases is reheated (e.g. 300°–500°C) and passed over a catalyst, whereupon considerable heat, about 52.7 kcal/gram mol of CO, is evolved in reaction 2. The reheating at the energy use area is accomplished by heat exchange with the methane/steam mixture leaving the energy delivery reactor. It is thereafter proposed that the methane will be dried and returned to the heat source, where it once again undergoes conversion to carbon monoxide and hydrogen.

Depending upon the requirements at the energy use area, varying distributions of high grade heat, electricity and low grade heat can be made from the system.

Reactions 1 and 2 are the well-known a) methane-steam reforming and b) methanation of CO reactions, respectively. However, the reduction of carbon monoxide by hydrogen can produce a wide variety of products. As is known from the various Fischer-Tropsch syntheses, assorted alcohols, ketones, ethers, aldehydes, esters, hydrocarbons, oils, waxes, etc. may result depending upon the catalyst and pressure and temperature conditions employed. Because of the likelihood of contamination, the large amount of water generated during the methanation reaction at the energy use end of the pipeline will have to be processed to remove any such contamination therefrom. This water will either have to be returned to the energy source for repetition of reaction 1, or will have to be supplied at the energy source location from other sources. If the water (in the liquid state) is to be returned to the energy source, this must be done by providing a third pipeline to avoid the difficulties (solid hydrate formation, problems of pumping a mixture of liquid and gas, freezing of the water) encountered in returning both water and methane through the same pipeline.

The instant invention, utilizing a different reversible chemical reaction, is proposed to overcome the aforementioned difficulties and to provide a larger amount of heat released per mol of gas transported.

DESCRIPTION OF THE INVENTION

At a heat source, such as a nuclear reactor, methane and carbon dioxide are reacted (at about 800°–900°C) to form a mixture of carbon monoxide and hydrogen. This reaction absorbs about 62 kcal/gram mol of CO formed. The mixture of gases produced is cooled by heat exchange with incoming cold $CH_4$ and $CO_2$ and is then pumped through a first pipeline at ambient temperature to an energy use area. At the energy use end of the first pipeline the gas mixture is heated (to about 350°–500°C) in the presence of steam and a catalyst. The CO and $H_2$ react exothermically to form $CH_4$ and $CO_2$ and thereby liberate about 61 kcal/mol of CO consumed. The heat evolved from this reaction is released across a heat exchanger for use as process heat or for conversion to electricity. Water is condensed and separated from the mixture of gaseous reactants and the dried, cooled $CH_4/CO_2$ mixture is returned to the heat source end via a second pipeline for repetition of the closed loop process described.

BRIEF DESCRIPTION OF THE DRAWING

The exact nature of this invention as well as objects and advantages thereof will be readily apparent from consideration of the following specification relating to the annexed drawing diagrammatically illustrating conduct of the process of this invention.

MANNER AND PROCESS OF MAKING AND USING THE INVENTION

For the transmission of energy via pipeline according to the instant invention the reactions employed are as follows:

$CH_4 + CO_2 \rightarrow 2CO + 2H_2$  3.

$2CO + 2H_2 \rightarrow CH_4 + CO_2$  4.

Reaction 3 is conducted at the heat source location at a temperature in about the 800°–900°C range, while reaction 4 is conducted at the energy use location at a temperature in the range of from about 350°–500°C. One pipeline is required to conduct the carbon monoxide/hydrogen gas mixture from the heat source to the energy use location and another pipeline is required to return the methane/carbon dioxide gas mixture to the heat source.

Reaction 3 is favored by low pressure while reaction 4 is favored by high pressure. Pipeline and reaction pressures are to be in the range of 1–60 atmospheres. The heating medium issuing from reaction 3 will still have a fairly high temperature and should be used to produce steam for local power generation.

It is expected that conventional steam reforming catalysts would be suitable for the conduct of reaction 3 and a catalyst system based on nickel or cobalt metal will be appropriate for the conduct of reaction 4. Reaction 4 can be carried out inside of what is essentially a steam boiler to raise high pressure steam for power generation, process heat etc. Relatively small tubes providing a relatively large heat exchange surface area will be needed to control and transfer the large amounts of heat released by the reacting gas per cubic meter. Reactor-boilers of this type have been developed for Fischer-Tropsch synthesis. The heat released by reaction 4 is taken up by a heat transfer medium, such as water (steam) or sodium metal, and carried to a boiler or turbine.

It is possible that some carbon or tar may form as a by-product of reaction 4, since such products are thermodynamically stable under the conditions recited above. Such product formation should be avoided, because nickel or cobalt catalysts suffer reduced efficiency from carbon formation. To minimize the formation of carbon, steam is made part of the hydrogen/carbon monoxide gas mixture before it enters the heat-delivery reactor at the energy use location. In addition to minimizing carbon formation, the presence of the steam in the delivery reactor provides additional heat capacity for absorbing local temperature excursions, which interfere with good reactor and catalyst performance. Also, the addition of $H_2O$ to the gas mixture results in a slight excess of hydrogen, which will improve the thermal conductivity of the mixture. Further, the vaporization and condensation of water furnishes an economical way to pump the gas mixture through the reactor and heat exchangers, since very little power is required to pump the liquid water. The heat for vaporization of the water is supplied via heat exchange by the heat of condensation of the steam present in the gas mixture leaving the heat delivery reactor.

In the conduct of the heat release reaction, should any carbon-containing by-products of low volatility be formed, which are unsuitable for gaseous transport in the return pipeline, these products are stripped from the condensed water before it is recycled into the water feed stream to the heat exchanger for steam generation prior to entering the heat delivery reactor. Such recovered by-products are valuable as solvents, fuels, oils, etc.

In case of imperfect selectivity of the catalyst material, even when the feed to the heat delivery reactor is $2CO + 2H_2$, some conduct of reaction 2 can occur resulting in the unwanted formation of minor amounts (about 2%) by volume of steam. Increasing the ratio of CO to $H_2$ will decrease this small amount of water formation still further. The best ratio can be readily determined by routine experimentation.

Table I

Approximate Equilibrium Compositions for the Reaction: $CH_4 + CO_2 = 2CO + 2H_2$

| °C | °K | Standard Gibbs Free energy change kcal/mol $CH_4$ | Fraction of $CH_4$ converted to CO at equilibrium at pressures of: | | |
|---|---|---|---|---|---|
| | | | 1 atm. | 10 atm. | 50 atm. |
| 927 | 1200 | −19.3 | 0.94 | 0.68 | 0.41 |
| 827 | 1100 | −12.5 | 0.84 | 0.48 | 0.27 |
| 727 | 1000 | −5.7 | 0.63 | 0.27 | 0.13 |
| 627 | 900 | +1.0 | 0.35 | 0.13 | .06 |

This table illustrates the effects of pressure and temperature on the conversion of $CH_4$ to CO by means of reaction 3.

Table II

Approximate Equilibrium Compositions at various pressures and 427°C(700°K) starting with $2CO + 2H_2 + 3.64 H_2O$ (based upon $CO + 3H_2 = CH_4 + H_2O$ and $2CO + 2H_2 = CH_4 + CO_2$)

| Pressure atm. | Mols CO | Mols $H_2$ | Mols $CO_2$ | Mols $CH_4$ | Mols $H_2O$ |
|---|---|---|---|---|---|
| 0.70 | .023 | .623 | 1.138 | .8385 | 3.34 |
| 3.3 | .0183 | .518 | 1.116 | .866 | 3.39 |
| 7.16 | .0066 | .207 | 1.047 | .947 | 3.54 |
| 47.5 | .0045 | .144 | 1.033 | .963 | 3.57 |
| 94 | .0032 | .103 | 1.023 | .973 | 3.59 |
| 148 | .0025 | .082 | 1.018 | .979 | 3.60 |

This table indicates the effect of pressure on the composition of the gas mixture produced by reaction 4 in the presence of steam at about 427°C.

The best catalyst systems useable with the reactions between CO and $H_2$ will be poisoned by sulfur; thus, sulfur should be removed from the input and makeup $CH_4$ gas, this gas being prepared from any convenient source, such as coal, oil, natural gas, etc.

The cold mixture of CO and $H_2$ behaves as an outstanding energy storage medium, because it stores far more energy per cubic meter than steam, compressed air or water. During periods of low demand, this mixture can be stored in reservoirs for release during periods of peak demand.

The same trench can be used for both the outgoing and return pipelines for the gases, as well as for other conduits, e.g. power lines.

As long as the temperature of the $CO_2/CH_4$ mixture remains above about 15°F, no condensation of $CO_2$ from the mixture will occur regardless of the pressure. However, small amounts of $CO_2$ and still smaller amounts of methane may dissolve in water condensed from the methane, carbon dioxide, water vapor mixture produced during the heat release reaction. If desired, this carbon dioxide and/or methane may be stripped from the water and returned with the bulk of the gas stream being recirculated to the heat source reactor. However, removal of all $CO_2$ is not necessary, because small amounts of carbon dioxide in the feed to the heat release reactor will act both to suppress carbon formation and to reduce unwanted oxidation of carbon monoxide by the steam. The amount of carbon dioxide circulated with the water to and from the heat release reactor can be regulated by the final temperature of the water in contact with the exiting gas mixture as well as by the pressure on the system.

At pressures in the range of from about 10 to about 100 atmospheres nearly all the carbon monoxide will be used up in heat release reaction 4 to produce all but a small amount of the theoretically expected methane yield. Thus, high heat release will occur per mol of gas delivered to the energy use area. Small amounts of carbon monoxide will react with the steam to form extra carbon dioxide and hydrogen such that a product gas from the heat release reaction conducted at about 47.5 atmospheres will have a molar C:H:O ratio of 1:2.050:1.035 (after dehydration). This C:H:O ratio is slightly richer in hydrogen and oxygen than the anhydrous feed gas arriving through the pipeline, whose molar C:H:O ratio will have been 1:2:1. After return via the second pipeline and passage through the heat source reactor, the 47.5 atmosphere product gas will form CO and $H_2$ containing small amounts of carbon dioxide and water. Thus, in effect the circulating gas mixture becomes slightly oxidized. During subsequent passes of the circulating gas through the system, considerably less oxidation will occur until ultimately a steady state is reached.

By operating the heat release reactor at about 94 atmospheres, instead of at 47.5 atmospheres, the gas mixture leaving this reactor is apparently not oxidized. In any event, regardless of the operating pressures and temperatures in the heat release reactor, steady state operating conditions for the system can be achieved.

BEST MODE CONTEMPLATED

The simplified flow sheet set forth as the drawing shows the preferred arrangement for conduct of the process of the instant invention. Thus, heat supply reactor 11 is located adjacent a high temperature source, such as a nuclear reactor producing helium gas at 900°–950°C. By countercurrent heat exchange with the helium gas, supply reactor 11 is heated to a maximum of about 925°C. As a mixture of $CH_4$ and $CO_2$ is received therein, reaction 3 occurs. The reaction products, carbon monoxide and hydrogen, exit from supply reactor 11 via conduit 12 to heat exchanger 13 wherein these reaction products are cooled to a temperature below about 40°C. This cooling of the product gas mixture brings about simultaneous heating of the cold methane/carbon dioxide stream entering from pipeline 14, this heated methane/carbon dioxide mixture being introduced to supply reactor 11 via conduit 16. Meanwhile, the helium flow having given up heat in reactor 11 and, thereby, having been cooled from its inlet temperature to a temperature of about 650°C is conducted into boiler 17 wherein the temperature of the helium flow is reduced to about 200°C, this heat release being utilized for the generation of steam for local heating and electric power requirements.

The cooled flow of mixed carbon monoxide and hydrogen gases is pressurized in compressor 18 and, thereafter, enters pipeline 19 for its long journey to the energy use area. When demand is low at the energy use area some or all of the compressed hydrogen/carbon monoxide gas mixture will be caused to enter reservoir 21 via line 22 and valve 23 (with valve 24 being appropriately set).

One or more additional compressors 26 will generally be required to meet the demands of pressurization for the conduct of reaction 4 in delivery (heat release) reactor 27. The mixture of hydrogen and carbon monoxide, preferably pressurized to about 45–100 atmospheres, enters heat exchanger 28. Water is also introduced into heat exchanger 28 through conduit 29, the water and the gas mixture being heated, preferably to about 350°C. When the heated, pressurized gas and steam mixture reaches delivery reactor 27 (via conduit 31) heat is released according to exothermic reaction 4 occurring over the nickel metal catalyst supported on alumina. This heat release is taken up by a separate fluid stream in counter-current heat exchange relationship with the reacting gases in the reaction volume and this heated fluid stream, preferably steam, carries this heat either to end use as process heat or to a boiler or turbine for the local generation of electrical power.

The gas mixture resulting from reaction 4 in the presence of steam (primarily methane, carbon dioxide and steam as indicated in Table II for pressures 47.5 and 94 atmospheres) is conducted from reactor 27 to heat exchanger 28 via conduit 32 for cooling thereof and simultaneous heating of the fluids from pipeline 19 and conduit 29. Most of the steam condenses and leaves heat exchanger 28 via conduit 33 taking with it the small quantities of carbon-containing by-products that may have formed and small amounts of methane and $CO_2$. This water enters stripper 34 wherein the by-products are separated from the water, which is then recirculated via conduit 29. The gas mixture (methane, carbon dioxide and water vapor) passes from heat exchanger 28 to drier 36 via conduit 37 being joined by methane/$CO_2$ from stripper 34 via conduit 38. Water removed from the gas stream is directed to conduit 29 and the cold (less than 40°C) $CH_4$/$CO_2$ gas mixture begins the return trip via pipeline 14. As in the case of pipeline 19, amounts of this cold gas mixture may be stored in or removed in reservoir 39 at desired times. Cold $CH_4$/$CO_2$ gas mixture arriving at the heat source location is ready to be heated in heat exchanger 13 preparatory to entering supply reactor 11 for the conduit of reaction 3. Make-up gas having an appropriate molar C—H—O ratio is supplied at arrow 40.

What I claim as new and desire to secure by Letters Patent of the U.S. is:

1. The process for transporting energy from a source of heat to an energy use area comprising the steps of:
   a. reacting a first gas mixture consisting principally of methane and carbon dioxide adjacent said heat source at a temperature in excess of about 650°C to produce a second gas mixture consisting principally of carbon monoxide and hydrogen,
   b. cooling said second gas mixture to a temperature below about 40°C,
   c. pressurizing and transporting said second gas mixture through a first conduit to said energy use area,
   d. heating said second gas mixture,
   e. reacting said second gas mixture in the presence of steam and a catalyst at a temperature of at least about 350°C and a pressure of at least about 10 atmospheres to release heat and yield principally methane and carbon dioxide,
   f. cooling the resulting mixture containing methane, carbon dioxide and water vapor below the condensation temperature for steam,
   g. separating water and by-products formed in step (e) from the mixture containing methane, carbon dioxide and water vapor to produce said first gas mixture,
   h. conducting the dried first gas mixture through a second conduit to said heat source,
   i. heating said dried first gas mixture and
   j. repeating the series of steps set forth above.

2. The process of claim 1 wherein heat released in step (b) is used in step (i) via heat exchange means.

3. The process of claim 1 wherein the first gas mixture is heated to about 925°C.

4. The process of claim 1 wherein the second gas mixture is reacted at a pressure in the 45–100 atmosphere range.

5. The process of claim 1 wherein heat released in step (f) is used in step (d) via heat exchange means.

* * * * *